United States Patent [19]
Sato et al.

[11] 3,869,537
[45] Mar. 4, 1975

[54] METHOD AND DEVICE FOR WASTE HEAT RECOVERY AND SAND REMOVAL IN THE BAYER PROCESS

[75] Inventors: Chosei Sato; Yasutoku Yamada; Yoshiyuki Takenaka, all of Yokohama, Japan

[73] Assignee: Showa Denko Kabushiki Kaisha, Tokyo, Japan

[22] Filed: Feb. 23, 1972

[21] Appl. No.: 228,624

[30] Foreign Application Priority Data
Feb. 4, 1971    Japan.................................. 46-8667

[52] U.S. Cl.......................... 423/121, 159/2, 159/45
[51] Int. Cl. ............................................... C01f 7/06
[58] Field of Search .......... 159/2, 45; 423/121, 312, 423/625

[56] References Cited
UNITED STATES PATENTS
2,946,658   7/1960   Donaldson.......................... 423/121
3,681,013   8/1972   Fish .............................. 423/625 X

*Primary Examiner*—Herbert T. Carter
*Attorney, Agent, or Firm*—Kurt Kelman

[57] ABSTRACT

In the manufacture of alumina by the Bayer process, a method comprising the steps of bringing the overflow from a multistage red mud thickener into counterflow contact with the steam generated in consequence of the flashing of bauxite-dissolved slurry so as to effect exchange of heat therebetween, separating and removing sand from the slurry by regulating the rate at which the slurry is discharged from the bottom of the column, and circulating the heated overflow and using it as the wash water in the former stage of the said thickener, all the said operations performed in one and the same column; and a device provided with inlet and outlet pipes for the overflow, an overflow type condenser, inlet and outlet pipes for the slurry, and a pipe for the removal of sand so as to effect the operations of the said method wholly in one and the same column.

3 Claims, 2 Drawing Figures

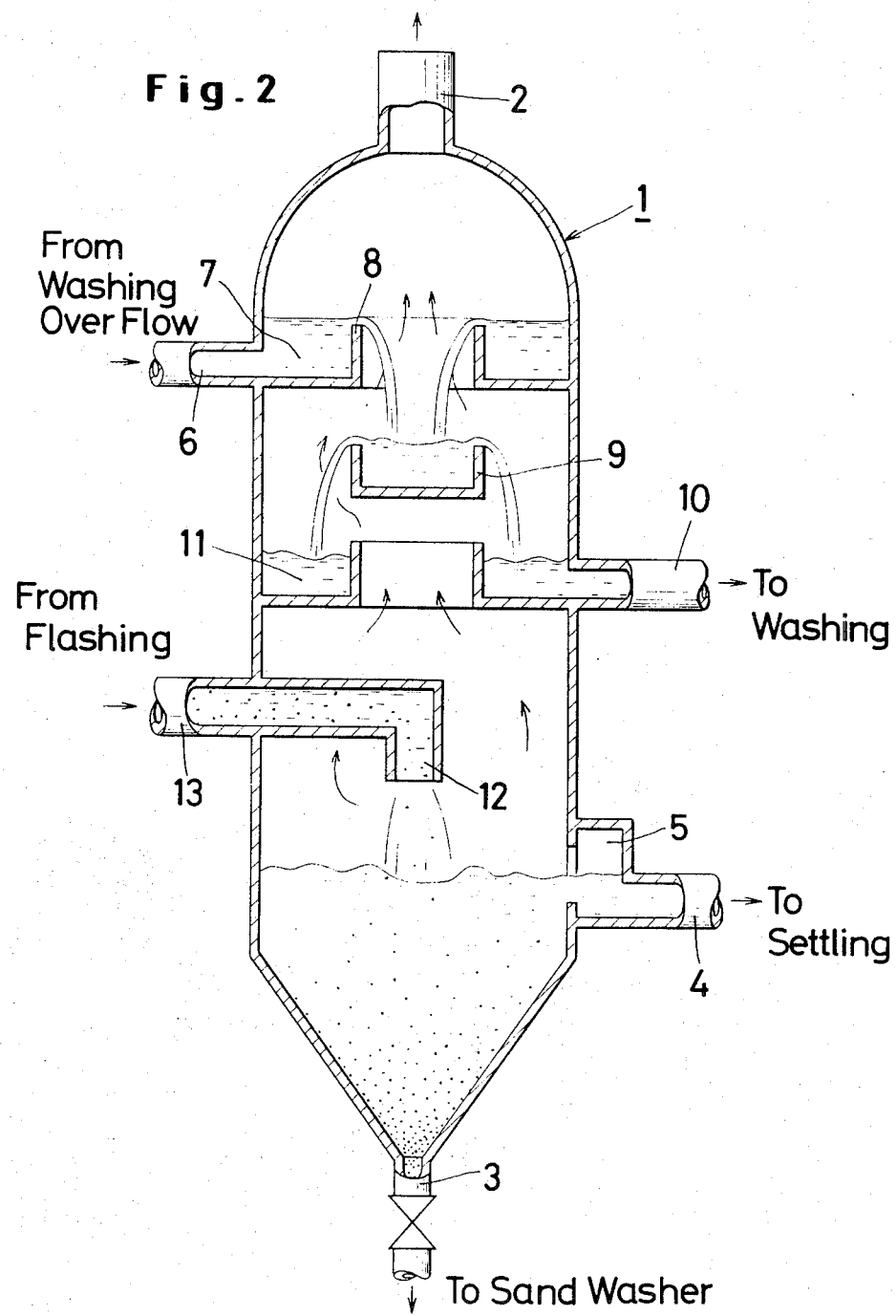

METHOD AND DEVICE FOR WASTE HEAT RECOVERY AND SAND REMOVAL IN THE BAYER PROCESS

This invention relates to a method and a device for the recovery of waste heat from the steam which is generated when bauxite-dissolved slurry is subjected to flashing in the manufacture of alumina by the Bayer process and for the removal of sand from the slurry.

The production of alumina by the Bayer process may be broadly divided into two steps. In the first step, bauxite is worked with the aqueous solution of caustic soda to dissolve alumina and obtain a slurry which contains the aqueous solution of sodium aluminate and insolubles. In the last step, solids are removed from this slurry and then hydrated alumina is precipitated from the aqueous solution of sodium aluminate. Bauxite containing monohydrated aluminia is dissolved with the aqueous solution of caustic soda at an elevated temperature under an increased pressure in a reactor called a "digester." The slurry of high temperature and pressure formed in the digester is subjected to a plurality of stages of flashing so as to be successively lowered in both temperature and pressure. It is sent through a process designed to separate the sand, namely, coarse particles predominantly of quartz, from the slurry. Then it is forwarded to the red mud thickener. Steam is generated as the slurry is freed of high temperature and pressure in the said flashing operation. The heat of this steam is recovered for heating the aqueous solution of caustic soda called "spent liquor" which is used for dissolving bauxite. As the slurry is passed through the successive stages of flashing, both temperature and pressure continue to fall by degrees. The steam generated in the last stage of flashing has a pressure equal to the atmospheric pressure and, therefore, does not have sufficiently high temperature. Unable to find any effective use, this steam has to date been blown off and wasted. Generally, the separation of sand is carried out subsequent to the blow-off. For the separation of sand, there are generally employed methods which utilize a liquid cyclone and other types of classifiers.

According to the conventional method, the discharge of waste steam and the separation of sand are carried out independently of each other. Lacking effective use of the steam, this method inevitably involves heavy consumption of steam. It also requires a special device designed exclusively for the removal of sand. This, accordingly, necessitates installation of pumps to effect the transfer of the slurry to these separate devices. Slurry pumps are highly liable to develop mechanical trouble and demand troublesome maintenance. It is, therefore, desirable to minimize use of slurry pumps.

The slurry which has been deprived of sand is washed in a multistage washing thickener to separate solids called "red mud" and produce alumina-dissolved liquid called "pregnant liquor", which is forwarded to the process designed to precipitate hydrated alumina.

It is the main object of this invention to provide a method and a device for heightening the ratio of heat recovery from the waste steam and improving the operation of sand removal. To be specific, the overflow from the red mud washing thickener is introduced into a column in which the flashing of slurry down to the atmospheric pressure is effected. Inside this column, the overflow liquid is brought into counterflow contact with the steam generated by the flashing so that the overflow liquid is heated by the heat recovered from the steam. The heated liquid is then refluxed to be used as the wash water in the washing thickener. In the meantime, the speed at which the slurry is discharged the bottom of the said column is relatively below the speed at which the sand in the slurry settles so as to separate the sand from the slurry. The sand thus separated is discharged through the outlet provided at the bottom. This invention also relates to a device which is provided with input and output pipes for the slurry, input and output pipes for the overflow liquid from the thickener, a pipe for the removal of sand, an overflow type condenser, and a steam vent so that all the operations mentioned above will be effected in one and the same column.

The other objects and characteristic features of this invention are described in detail hereinafter with reference to the attached drawing.

FIG. 2 is a cross section of one embodiment of the device of this invention.

Figure 1:
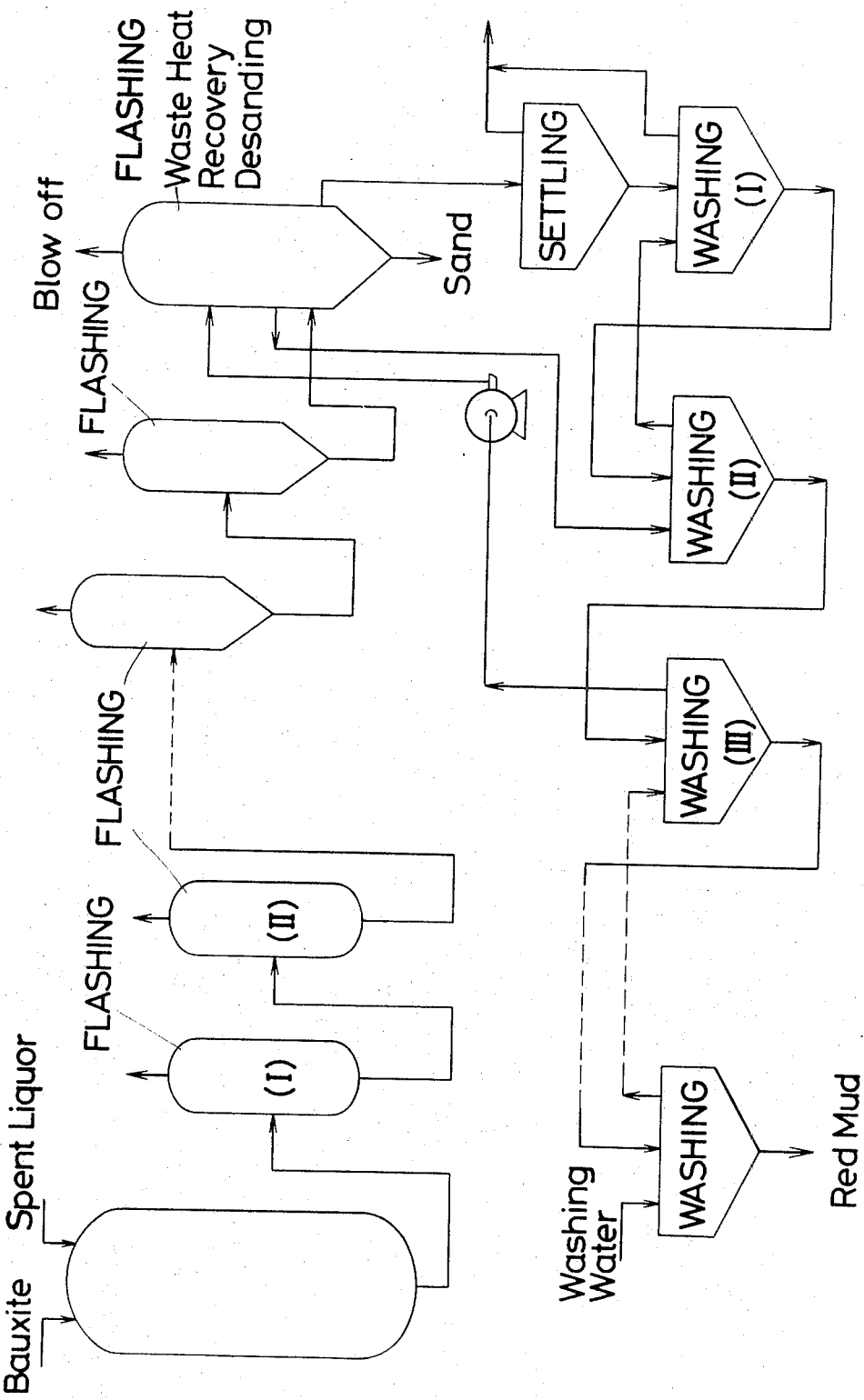
FIG. 1 is a flow sheet illustrating the working of the present invention.

Referring to FIG. 1, the digester serves to cause reaction of bauxite with the aqueous solution fo caustic soda under conditions of high temperature and high pressure such as, for example, 230 to 240°C and 30 to 40 kg/cm$^2$. The alumina component of the bauxite is dissolved by the aqueous solution of caustic soda. In conjunction with the sand (coarse particles predominantly of quartz) and the red mud composed mainly of $Fe_2O_3$, the dissolved alumina is discharged in the form of slurry out of the digester. This slurry has high temperature and high pressure and, therefore, must be sent through a plurality of flashing tanks so as to be lowered successively in both temperature and pressure. While in passage through the flashing tanks, the slurry releases steam. The steam generated in consequence of the flashing operation is recovered for preheating the aqueous solution of caustic soda which is used for dissolving bauxite. The last-stage flashing tank serves not only as a flashing tank but also as the waste heat recovery and desanding device of this invention illustrated in FIG. 2.

Referring to FIG. 2, 13 denotes a feed pipe for the slurry, 12 a flashing nozzle, 4 a discharge pipe (incorporating an overflow space 5) for the slurry, 6 a feed pipe for the overflow liquid from the red mud thickener, 10 a discharge pipe for the overflow liquid, 2 a discharge pipe for steam, and 3 a discharge pipe for the separated coarse sand particles. The slurry which has been introduced via the feed pipe 13 into this waste heat recovery and desanding device is here subjected to the last stage of flashing and consequently brought down to the atmospheric pressure and the temperature level below the boiling point. The sand is separated from the slurry and the slurry free of the separated sand is withdrawn through the discharge pipe 4. The slurry is worked in the settler to be separated into red mud and pregnant liquor. Together with the washings of red mud, the pregnant liquor is forwarded to the next process for hydrated alumina precipitation. The sand which collects at the bottom of the column is withdrawn through the discharge pipe 3. As occasion demands, it may be washed further for complete recovery of alumina component and alkali component and then discharged from the system. The red mud which has been separated in the settler is sent through a plurality of thickeners 1, 2, 3... arranged in series, wherein it is washed as it is brought into counterflow contact with the wash water. From the last-stage thickener, the red mud which is now freed thoroughly of alkali component and alumina component is discharged. In the present invention, the wash water which is the overflow from each thickener and which is forwarded successively from each thickener to the next thickener in the backward direction from the last through the first thickener in the series is withdrawn at any desired stage and then fed into the waste heat recovery and sand removal device, wherein the wash water receives heat from the steam generated in consequence of the last-stage flashing. The heat wash water is sent into the thickener following the thickener from which the wash water was withdrawn. The sodium aluminate adhering to the red mud is recovered by the counterflow washing. It tends to decompose itself and produce alumina as the soda concentration decreases and the temperature falls. This phenomenon is called autoprecipitation or alumina reversion. The said heat exchange serves to heighten the temperature of the wash water. As a consequence, the alumina reversion in the thickener is prevented to a fairly large extent and the attendant loss of alumina is lowered accordingly. As an overall effect, the thickener has its washing efficiency enhanced.

For practical purposes, it is desirable that the overflow having a temperature of about 70°C and taken from the third thickener is fed to the waste heat recovery and desanding device, heated to over 90°C by exchange of heat, and used as the wash water for the second thickener. This is because the autoprecipitation actually takes place in the first and second thickeners in virtually all cases.

This invention is characterized in that the separation of sand from the slurry is carried out in the same device that is used for the aforementioned exchange of heat. The slurry which has flowed into column 1 via the nozzle 12 pools in the lower part of the column and the sand collects at the bottom of the column. Then, the slurry is withdrawn via the discharge pipe 4. While the slurry is retained in the column, the rate at which it is discharged is lowered below the rate at which the sand settles, i.e., the slurry hold-up time is sufficient to permit settlement of the sand. Because of the difference of rate, the sand is allowed to settle and collect at the bottom portion of the slurry. Efficient removal of sand can be accomplished by periodically removing the densely collected portion of sand. If the said rates are so regulated as to cause sedimentation of only sand particles having particle diameters larger than 48 mesh, then the removal of sand can be accomplished to an extent such that the remaining sand particles will offer practically no hindrance to the subsequent settling and thickening operations.

Now, an explanation is made with respect to the waste heat recovery and desanding device of the present invention. The housing 1 of this device is provided at the top with a discharge pipe 2 for steam, at the bottom with a discharge pipe 3 for the separated coarse sand particles, at the lower section with a feed pipe 13 for the slurry and a discharge pipe 5 for the slurry (incorporating an overflow space 5), at the upper section with a feed pipe 6 for the wash water used for red mud thickener, and at the middle section with a discharge pipe 10. Inside the device, an overflow duct 7 and an overflow barrier 8 are disposed so as to be connected to the pipe 6 and, below the overflow barrier 8, there is provided a tray-shaped reservoir 9 at a position convenient for receiving the liquid overflowing the barrier 8. Around the base of the tray-shaped reservoir 9, there is formed a duct 11 on the inside wall of the column so as to receive the liquid overflowing the reservoir 9. This duct 11 is disposed so as to communicate with the discharge pipe 10.

The feed pipe 13 for the slurry is provided at its forward end with a nozzle 12. The lower end of the column is formed in the shape of a funnel. At the lowermost tip of this funnel is provided a discharge pipe for the separated coarse sand particles.

In this device, the slurry flows down the nozzle 1 and the steam generated at this point ascends in the column in the direction indicated by the arrow mark. In the meantime, the wash water originating in the third thickener and fed through the inlet pipe 6 flows along the overflow duct 7, over the overflow barrier 8 and into the tray-shaped reservoir 9. It then flows into the duct formed around the base of the reservoir 9 and is discharged via the outlet pipe 10. While this wash water is travelling through this overflow section, it is brought into counterflow contact with the steam generated from the slurry and consequently raised in temperature. The steam which has thus served the purpose of heat exchange is released via the outlet 2 formed at the top of the column. The slurry which has been introduced through the nozzle 12 pools at the bottom of the column and then is discharged via the outlet pipe 4. The sand particles contained in the slurry are caused to settle and to collect at the bottom portion of the pool of slurry when the rate at which the slurry is discharged is lowered below the rate at which the sand particles settle. This separation is easily accomplished because the rate at which the sand particles settle is extremely high. Separation of sand particles having particle sizes greater than 48 mesh results in the separation of 10 – 15% of solids present in the slurry. This means that about 80% of all the sand particles present therein are removed. The sand particles remaining in the slurry will no longer offer any hindrance to the operation of the red mud thickener.

This invention, thus, permits effective recovery and use of the waste heat of the steam which is generated in the last stage of slurry flashing and which has to date been discharged into the atmospheric air as useless. The increase in the temperature of the wash water for thickener brings forth an increase in the overall temperature of the aqueous solution of caustic soda which is forwarded to the stage of hydrated alumina precipitation with a further result that the consumption of steam per ton of alumina produced by the Bayer process is reduced.

The increased temperature of the wash water for red mud serves not merely to prevent autoprecipitation in the thickener but also to heighten the washing efficiency. This has a consequence of improving the yield of alumina from bauxite.

According to this invention, the recovery of waste heat from the slurry and the removal of sand from the slurry are effected simultaneously in one and the same device. It, therefore, does not require the use of separate devices for blow-off operation and desanding operation which have proved indispensable for the conventional techniques. Thus, devices required for the transfer of slurry to such separate devices and/or motive force required for their operation can be eliminated partly.

Further, the use of one unified device permits economization of floor space requirement for the plant.

A preferred embodiment of this invention is described. It should be noted that this invention is not in any way limited to this embodiment.

EXAMPLE

In the system of FIG. 1, there was used a waste heat recovery and desanding device of the present invention having the construction shown in FIG. 2. The device measured 6m in diameter and 8m in height.

The slurry containing 130 g/l of $Al_2O_3$, 125 g/l of $Na_2O$ and 45 g/l of solids and discharged under conditions of 115°C of temperature and 0.45 kg/cm² of pressure from the penultimate flashing stage was fed at a flow rate of 500 m³/hr into the device of this invention. From the third thickener, the overflow liquid containing 18 g/l of $Al_2O_3$ and 20 g/l of $Na_2O$ and having a temperature of 63°C was fed at a flow rate of 150 m³/hr into the upper section of the device and then allowed to exchange heat with the steam being generated in consequence of slurry flashing. The overflow liquid now containing 17 g/l of $Al_2O_3$ and 19 g/l of $Na_2O$ and having a temperature of 95°C was withdrawn at a volume rate of 162 m³/hr. This was used as the wash water for the second thickener. At the bottom inside the column, the slurry was deprived of sand particles. Consequently, the slurry now containing 134 g/l of $Al_2O_3$, 128 g/l of $Na_2O$ and 41 g/l of solids was discharged. The steam which had undergone heat exchange was discharged at a rate of 1 ton/hr via the vent formed at the column top. Sand particles were discharged at a rate of 2.7 tons/hr via the pipe formed at the bottom. The particle size distribution of the sand is shown in the following table.

Table

| | | | | |
|---|---|---|---|---|
| Particle size distribution of solids in slurry | Coarser than | 10 | mesh | 0% (Cumulative) |
| | do. | 14 | do. | 0.2 |
| | do. | 20 | do. | 2.0 |
| | do. | 28 | do. | 7.0 |
| | do. | 48 | do. | 11.8 |
| | do. | 100 | do. | 13.0 |
| | Finer than | 100 | mesh | 87.0 |
| Particle size distribution of sand particles | Coarser than | 10 | mesh | 0% (Cumulative) |
| | do. | 14 | do. | 1.3 |
| | do. | 20 | do. | 13 |
| | do. | 28 | do. | 46 |
| | do | 48 | do. | 77 |
| | do. | 100 | do. | 85 |
| | Finer than | 100 | mesh | 15 |

The production system was actually operated by using the device of this invention. In the present example, the amount of steam released into the atmospheric air was about 1 ton/hr, while in the operation excluding the use of this device, the amount of released steam was about 13 tons/hr. This represents a saving of about 0.15 ton of steam per ton of alumina produced.

The recovery of alumina from bauxite was also increased by about 1%. This represents a cut to one third of the average loss of 15 kg/ton of alumina due to the conventional alumina reversion.

What is claimed is:

1. In the Bayer process for production of alumina by treating bauxite containing monohydrated alumina with an aqueous solution of caustic soda at high temperature and high pressure to form a slurry containing sand, said slurry being subjected to multistage flashing for lowering both temperature and pressure and generating steam, said slurry passing after said flashing through a series of continuous red mud thickeners in counterflow contact with wash water, and recovering alumina and caustic soda contained in said slurry from the overflow liquid from the red mud thickeners, the improvement which comprises the steps of introducing overflow liquid from the red mud thickener into a vessel, last stage flashing said slurry in said vessel, bringing said overflow liquid into counterflow contact with the steam generated by said last-stage flashing of slurry within said vessel and effecting heat exchange from the steam to the overflow liquid, forwarding heated overflow liquid back to the thickener and using it as wash water for red mud, discharging slurry from the vessel after flashing at a rate permitting settling of sand particles in a lower section of sand vessel, separately removing sand and slurry out of said vessel.

2. The method according to claim 1 wherein the overflow liquid from a third-stage red mud thickener is brought into counterflow contact with steam generated by last-stage flashing of said slurry, the heated overflow liquid being used as wash water for a second-stage red mud thickener.

3. The method according to claim 1 wherein the discharging of slurry is at a rate permitting settling of sand particles having particle sizes greater than 48 mesh.

* * * * *